2,744,132

METHOD OF PRODUCING ALKYL PHOSPHONYL DIHALIDES

John P. Clay, Dugway Proving Ground, Tooele, Utah, assignor to The Board of Higher Education (Hunter College), New York, N. Y.

No Drawing. Application June 7, 1952, Serial No. 292,390

3 Claims. (Cl. 260—543)

The present invention relates to an improved method for producing organic phosphonyl halides, and it relates more particularly to a new and improved method for producing alkane phosphonyl dichlorides.

The alkane phosphonyl dichlorides (alkane dichlorophosphine oxides) are important as intermediates in the preparation of a variety of organo-phosphorus compounds. There have been many methods proposed and employed for the preparation of these compounds, but they have generally proved highly unsuitable and leave much to be desired from a commercial production viewpoint. Among the drawbacks and disadvantages of the earlier methods are their extreme complexity, the requirement of reagents difficult to prepare, complicated side reactions and their restricted application only to special cases. The requirements of very close process control and expensive chemical reagents, the extensive equipment and the relatively poor yields all contributed to the generally high cost of the alkane phosphonyl dichlorides.

It is thus a principal object of the present invention to provide a novel and improved method for the production of organic phosphonyl halides.

Another object of the present invention is to provide a novel and improved method for the production of alkane phosphonyl dichlorides.

Still another object of the present invention is to provide a novel and improved method for the production of alkane phosphonyl dichlorides which is applicable to a wide range of compounds.

A further object of the present invention is to provide a novel and improved method for the producing of alkane phosphonyl dichlorides which method is characterized by its simplicity, versatility and use of inexpensive reagents.

The above and other objects of the present invention will become apparent from a reading of the following description which sets forth preferred embodiments thereof.

The present invention broadly contemplates the method of reacting an organic halide, the trihalide of aluminum and the trihalide of phosphorus and hydrolizing the reaction product thereof to produce an organic phosphonyl halide. In its more limited scope, the method is applied to an alkyl chloride and the aluminum trihalide is alumium trichloride and the phosphorus trihalide is phosphorus trichloride. The reaction product is an insoluble complex which is hydrolyzed to produce an alkane phosphonyl dichloride. The improved method as applied to the alkyl chlorides and where the halides are chlorides, is believed to be represented essentially by the following reactions wherein R is an alkyl radical:

1. $RCl + PCl_3 + AlCl_3 \rightarrow RCl.PCl_3.AlCl_3$ (insoluble complex)

2. $RCl.PCl_3.AlCl_3 + 7H_2O \rightarrow$
$AlCl_3.6H_2O + RPOCl_2 + 2HCl$

Several factors are important. These factors are: (a) order of mixing reagents; (b) control of temperature; (c) anhydrous condition of the reagents and apparatus; (d) molal ratio of water to complex used in the hydrolysis.

It was found that reaction 1 did not take place readily if the $AlCl_3$ was dissolved in the alkyl chloride before the $PCl_3$ was added. This difficulty was eliminated by mixing the $PCl_3$ with the $AlCl_3$, then adding the alkyl chloride.

The temperature of reaction 1 should be controlled at near the reaction temperature to prevent side reactions. This is especially true in the preparation of secondary and tertiary alkyl products. It is highly important to control the temperature of reaction 2 in the case of the hydrolysis of primary alkyl complexes, lest the dichloride be further hydrolyzed to the corresponding acid. Secondary and tertiary alkane phosphonyl dichlorides are less readily hydrolyzed.

The molal ratio of $H_2O$ to complex being hydrolyzed should be within the limits of 7:1 to 11:1, or very poor yields will result.

The high heat stability of the complex (melting point of the $C_2H_5Cl.PCl_3.AlCl_3$ is approximately 370°) and the fact that solutions of the complex in nitromethane conduct an electric current and produce an abnormal lowering of the freezing point are indicative of its ionic nature and suggest a formula such as $$(RPCl_3)^+ (AlCl_4)^-$$

Since the complex does not form readily when the alkyl halide is allowed to dissolve the $AlCl_3$ before the addition of the $PCl_3$, the mechanism of the complex formation may proceed in the following manner:

3. $RCl + PCl_3 \rightleftharpoons RPCl_4$
4. $RPCl_4 + AlCl_3 \rightarrow (RPCl_3)^+ (AlCl_4)^-$ A possible mechanism to account for the simultaneous hydrolysis and hydration of the complex may be expressed by the following reactions:

5. $(RPCl_3)^+ + H_2O \rightarrow (RPOCl)^+ + 2HCl$
6. $(AlCl_4)^- + 6H_2O \rightarrow AlCl_3.6H_2O + Cl^-$
7. $(RPOCl)^+ + (Cl)^- \rightarrow RPOCl_2$.

The following are examples of the present improved method:

All reagents used, with the exceptions noted, were of reagent grade. Isopropyl chloride and tert-butyl chloride were prepared from the alcohols by well-known methods. All of the alkyl chlorides used were redistilled over anhydrous calcium chloride. The apparatus used was dried at 105° and cooled in a desiccator just prior to use.

(a) *Preparation of ethyl phosphonyl dichloride.*—First, 13.3 g. of anhydrous $AlCl_3$ was weighed into a glass-stoppered bottle, followed by 13.7 g. of $PCl_3$. To this mixture was added 19.3 g. of ethyl chloride, and the bottle was closed and placed in a shaking machine. (All reagents and the reaction bottle were cooled in a refrigerator of approximately 4° just prior to weighing and mixing. Up to the moment of closing the bottle the temperature of the mixture had risen to 9°.)

After 15 minutes' shaking, the temperature of the mixture had risen to 23°. At this temperature the solid $AlCl_3$ dissolved, accompanied by a sudden rise in temperature which reached approximately 35°. The solution became pale yellow in color. After about 12 minutes the temperature dropped to 25°, accompanied by the deposit of a white crystalline precipitate. The shaking of the mixture was continued for one hour. The reaction bottle was then placed in a refrigerator at approximately 4°. After 24 hours the supernatant liquid was poured off, leaving 18 g. of dry crystalline material, M. P. 370° (approximately). A solution of the complex in nitromethane was found to exhibit an electrical conductivity equivalent to that of a univalent salt in water.

*Hydrolysis of the complex $C_2H_5Cl.PCl_3.AlCl_3$.*—This crystalline complex was dissolved in 200 ml. of methylene chloride, transferred to a three-necked 500-ml. flask, cooled to 0°, and hydrolyzed by adding dropwise (at the rate of 10 drops per minute) 25.3 ml. of cold concentrated hydrochloric acid (4°). The mixture was stirred for two hours, beginning with the addition of the first drop of hydrochloric acid. The reaction flask was immersed in an ice-water mixture which kept the temperature between 0° to 7° throughout the hydrolysis. The cold mixture was filtered and the filtrate was distilled to remove excess solvent, followed by vacuum-distillation of the residue at 28 mm. The vacuum-distillate yielded 7.6 g. of a colorless liquid, B. P. 174.5°.

The substance reacted with water at 25° with approximately the vigor shown by $PCl_3$; however, it reacted very slowly in an ice-water mixture. These characteristics serve to identify the material as $C_2H_5POCl_2$. The lead salt of the acid, $C_2H_5PO(OH)_2$, was prepared by warming the aqueous solution of the hydrolytic product of $$C_2H_5POCl_2$$

with $Pb(OH)_2$ after removal of the chloride with $AgNO_3$.

(b) *Preparation of isopropyl phosphonyl dichloride.*—To 26.1 g. of $AlCl_3$ in a three-necked flask, equipped with a thermometer, stirrer, and reflux condenser was added 26.8 g. of $PCl_3$. The flask was cooled to 10° and 44.6 g. of isopropyl chloride was added. The mixture was stirred while the temperature was allowed to rise gradually until the reaction started at about 15°. The temperature was maintained at less than 25°. Even at 25° some brownish degradation products appeared, accompanied by the evolution of HCl. The reaction was complete in 15 minutes. At this time the flask was half-filled with a white crystalline complex discolored at some points where the temperature had risen too high. The material was stored overnight in a refrigerator at 4°, then subjected to reduced pressure (30 mm.) at 25° to remove excess isopropyl chloride. The residue was dissolved in 170 ml. of $CH_2Cl_2$, cooled to —5°, and hydrolyzed by the dropwise addition of 44 ml. of cold concentrated HCl over 85 minutes, the mixture being stirred vigorously all the while. After a quick filtration, 12.2 g. (38.6%) of isopropyl phosphonyl dichloride was recovered from the filtrate upon vacuum distillation. This distillate was a colorless liquid, B. P. 76° at 23 mm., which was immiscible with water and hydrolyzed very slowly at room temperature, but more rapidly with hot water (50°).

(c) *Preparation of tert-butyl phosphonyl dichloride.*—The method used was exactly as described in (b). Quantities used were 33.3 g. of $AlCl_3$, 34.35 g. of $PCl_3$, and 46.2 g. of tert-butyl chloride. The reaction began at 11° and was complete in 10 minutes; yield of the complex, 99%. The complex was hydrolyzed with 57 ml. of concentrated HCl at temperatures between —10° and 5° in 150 ml. of methylene chloride. A yield of 19.3 g. (44%) of tert-butyl phosphonyl dichloride, was recovered by vacuum-distillation. The material is a white, wax-like solid, M. P. 123°, subliming at 110° at 25 mm. It has a distinct camphor-like odor, does not hydrolyze even with hot water but does react readily with water when dissolved first in ethyl alcohol.

While there have been described preferred embodiments of the present invention, it is obvious that numerous alterations and omissions may be made without departing from the spirit thereof.

What is claimed is:

1. The process of producing $RPOCl_2$ where R is an alkyl radical containing up to 4 carbons comprising the step of partially hydrolyzing the complex $RCl \cdot PCl_3 \cdot AlCl_3$ in cold concentrated hydrochloric acid, the molal ratio of water to complex being between 7:1 and 11:1.

2. The process in accordance with claim 1, wherein said partial hydrolysis is effected at temperatures between approximately —10° C. and 7° C.

3. The improved process in accordance with claim 1, wherein R is an alkyl radical selected from the class consisting of ethyl, isopropyl and tert-butyl.

References Cited in the file of this patent

Michaelis: Ber. 13, page 2175 (1880).
Auger Compt. Rend. 139, page 671 (1904).
Michaelis: Ann. Der. Chemie, vol. 293, pp. 223–224.
Plotnikov: Chem. Ab., vol. 17, p. 3293 (1923). (See also J. Russ. Phys. Chem., vol. 48, pp. 1891–6 (1916).
Klotz et al.: Jour. Am. Chem. Soc., February 1947.